Jan. 27, 1942.       G. A. PERKINS ET AL       2,271,092
PROCESS FOR PREPARING ALKYL SULPHATE LIQUORS
Filed April 24, 1931
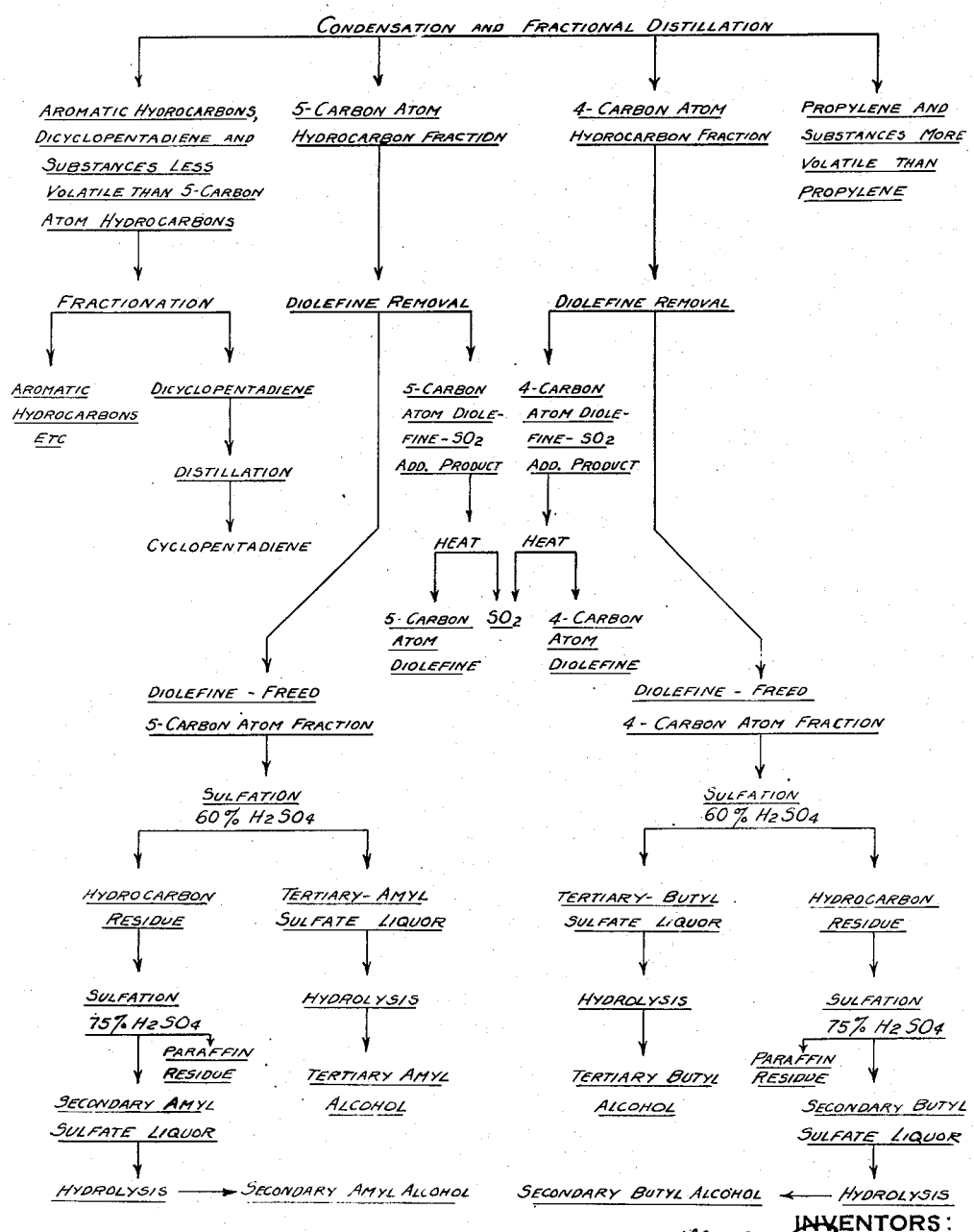
INVENTORS:
Granville A. Perkins,
John A. Davies,
BY ATTORNEYS
Byrnes Townsend & Potter.

Patented Jan. 27, 1942

2,271,092

UNITED STATES PATENT OFFICE 2,271,092

PROCESS FOR PREPARING ALKYL SULPHATE LIQUORS

Granville A. Perkins, South Charleston, and John A. Davies, Charleston, W. Va., assignors, by mesne assignments, to Union Carbide and Carbon Corporation, a corporation of New York Application April 24, 1931, Serial No. 532,678

14 Claims. (Cl. 260—460)

The invention is an improved process for preparing alkyl sulphate liquors from olefine hydrocarbons having four or more carbon atoms in the molecule, and may be advantageously employed as a step in the preparation of secondary and tertiary alcohols having a corresponding number of carbon atoms in the molecule.

Vapor-phase cracking of petroleum or petroleum fractions produces hydrocarbon mixtures containing a variety of saturated and unsaturated hydrocarbons. Mixtures of this type are preferred as the starting material for the process.

It is an object of our invention to utilize cracked hydrocarbon mixtures to form alkyl sulphate liquors in such a manner as will result in the recovery of a large proportion of the constituents of the starting material.

Another object is to provide an economical process for the formation of alcohols by means of our process for preparing alkyl sulphate liquors.

Cracked hydrocarbon mixtures may contain paraffin hydrocarbons, olefines, diolefines and aromatic hydrocarbons, together with lesser quantities of acetylene and hydrogen. Due to the practical limitations of ordinary methods of fractional distillation it is not feasible, by such methods, to isolate the individual olefines of higher molecular weight than propylene from a mixture containing these compounds. For example, butadiene cannot be separated from a mixture containing other four carbon atom hydrocarbons by ordinary fractional distillation for the reason that it forms with n-butane a constant boiling mixture which boils very close to the boiling points of isobutylene and butene-1.

Previously known processes using the olefine hydrocarbons to form alkyl sulphate liquors have caused the diolefines and more reactive hydrocarbons contained in admixture with the olefines, to be removed as polymers. This is uneconomical because it not only renders the diolefines, so polymerized, unfit for further use, but, also, because it results in losses of the valuable olefines to some extent inasmuch as it is impossible to remove the diolefines by polymerization without causing simultaneous condensation of some of the olefines present. We have found that due to this effect, the yields of alcohol obtainable by sulphation methods from mixtures of hydrocarbons containing diolefines are lower than those obtainable from material which is free from diolefines. This phenomenon has been reported by Fritzche, Chemische Industrie, 35, 638 (1912), and other investigators on various similar hydrocarbon mixtures. The present invention avoids or mitigates this difficulty and its advantages will be apparent from the following description.

In general, the process comprises a physical separation of one or more fractions, substantially free from propylene and ethylene and from aromatic hydrocarbons, from a mixture of cracked hydrocarbons. This may be accomplished by known methods of condensation and fractional distillation, which are no essential part of our invention. The fraction or fractions so obtained are then treated to remove diolefines, such as butadiene, isoprene, cyclopentadiene and 2,3 dimethyl 1,3 butadiene. This removal is effected in a manner which does not destroy the olefines present in the mixture, and which removes the diolefines in a form from which they may be easily regenerated. The diolefine-freed material is then treated with successive applications of sulphuric acid of suitable strength under appropriate conditions of temperature and pressure. These treatments provide alkyl sulphate liquors of both tertiary and secondary derivation. The alkyl sulphate liquors may be treated to form alcohols by well known processes which are not a part of this invention.

The following examples are illustrative of the invention. The process is further illustrated in a preferred form by the accompanying flow-sheet.

I. Two fractions, substantially free from propylene and substances more volatile than propylene, and from aromatic hydrocarbons and substances less volatile than hydrocarbons having five carbon atoms in the molecule, were separated from a mixture of cracked hydrocarbons produced by the vapor-phase cracking of gas oil. One fraction contained principally hydrocarbons having four carbon atoms in the molecule, including butane, butene-1, butene-2, isobutylene and butadiene. This fraction will be hereinafter identified as the 4-carbon atom fraction. The other fraction contained principally hydrocarbons having five carbon atoms in the molecule, including pentane, pentene-1, pentene-2, isopropyl ethylene, asymmetrical methylethyl ethylene, trimethyl ethylene and isoprene, with lesser quantities of higher olefines. This fraction will be hereinafter identified as the 5-carbon atom fraction.

The first step after this fractionation is the removal of diolefines from each fraction. Cyclopentadiene, if present, may be removed from the 5-carbon atom fraction by condensing the hydrocarbons to liquid form and dimerizing this substance to dicyclopentadiene. This can be done by allowing the liquid hydrocarbons to stand for a long period of time, or by heating the liquid under pressure for a few hours. The dimer has a higher boiling point than the balance of the hydrocarbons of the 5-carbon atom fraction and may be separated therefrom by fractional distillation at a reduced pressure. We prefer to remove the cyclopentadiene as a step incidental to the first physical separation inasmuch as it has been found convenient to fractionate the higher boiling hydrocarbons at increased pressures and at a fairly high temperature. As a result, the cyclopentadiene is dimerized and falls into the fraction containing the aromatic hydrocarbons in the initial fractionation. Dicyclopentadiene may be easily separated from these compounds by distillation at a reduced pressure. The isolated dimer can be converted to the original cyclopentadiene by distilling the dimer at atmospheric pressure.

The next step in the procedure is the removal of diolefines, other than cyclopentadiene, from the separate fractions in a form from which they may be easily recovered, and in a manner which does not destroy the olefines in the fractions.

The 4-carbon atom fraction is treated to remove butadiene. This may be conveniently accomplished by causing the hydrocarbon to react with sulphur dioxide in the presence of a halogen-containing body which serves to promote the formation of the monomeric, soluble, crystalline sulphur dioxide addition product of the diolefine. An example of such an agent is sulphur chloride. Typical conditions for carrying out this removal are as follows: 6.8 kilograms of a 4-carbon atom fraction containing about 15% of butadiene were placed in a 20 liter autoclave to which was added 6.8 kilograms of sulphur dioxide and 30 cc. of sulphur chloride. The autoclave was then heated to 100° C. for 18 hours, the internal pressure being about 27.5 atmospheres. This treatment converted about 80% of the butadiene to the monomeric, soluble, crystalline addition product. The contents of the autoclave were charged into a 40 liter still and heated to about 70° C. The distillate was collected in a brine-cooled receiver and was allowed to stand at room temperature for two weeks in large steel cylinders. This completed the conversion of the butadiene to the sulphur dioxide addition product. The contents of the cylinders was redistilled and the distillate was passed through two scrubbers containing 16% NaOH into brine-cooled receivers. This distillate was the olefine-bearing 4-carbon atom fraction and contained less than 0.5% butadiene.

The butadiene-sulphur dioxide addition product was allowed to collect in the kettle of the still. It may be decomposed by heating, first to about 95° C., most of the sulphur dioxide being boiled off, and then to about 120° C. The gas is scrubbed to remove sulphur dioxide, dried and cooled. This gives a gas which is largely butadiene. The only by-product of this process is an insignificant amount of tar which collects in the kettle of the still. Diolefines other than cyclopentadiene may be removed in a form by which they are easily recovered by methods other than the treatment given, for example, by the methods disclosed in Patents 1,993,681, dated March 5, 1935, to G. A. Perkins, and 1,948,777, dated February 27, 1934, to C. O. Young and G. A. Perkins.

The diolefine-freed 4-carbon atom fraction is next treated with sulphuric acid to form tertiary-alkyl sulphates. For this treatment acid varying from 45% or 55% to 65% concentration may be used, but a concentration of about 60% is preferred. The conditions of sulphation, such as the temperature and the time of reaction, will vary with the strength of the acid. In general, temperatures below 35° C., for instance in the range of 10° to 35° C., are suitable. Less concentrated acid requires higher temperatures and longer reaction times than strong acid. Typical conditions for the absorption of a diolefine-freed 4-carbon atom fraction are as follows: 11.92 kilograms of a 4-carbon atom fraction in the liquid state containing 45.5% of butane, 22.3% isobutylene and 32.3% of butenes 1 and 2 was continuously agitated with 17.72 kilograms of 61% sulphuric acid for four hours at an average temperature of about 24° C. At the end of this time the unabsorbed hydrocarbons were removed. This quantity of the fraction was 9.74 kilograms and it contained 0.7% of isobutylene, 40.9% of butenes 1 and 2 and 54.3% of butane.

The liquor formed contained tertiary-butyl sulphate produced by the action of the acid on the isobutylene. From the hydrolysis of the tertiary-butyl sulphate liquor, so prepared, 2.38 kilograms of tertiary-butyl alcohol was obtained. This corresponds to an overall tertiary-butyl alcohol yield of 67.7% based on the total amount of isobutylene in the original fraction, or an efficiency of 95.4% based on the original amount of isobutylene minus the amount recovered. In this sulphation the only by-product was 132 grams of oil. Instead of converting the tertiary-butyl sulphate into alcohol, it may be utilized to produce polymers, such as di-isobutylene, if desired.

The 4-carbon atom hydrocarbons remaining after the first acid treatment are then treated with more concentrated acid to form secondary-alkyl sulphates. Acid varying from 65% or 70% to 95% concentration may be used according to the conditions of time and temperature which are employed. In general, temperatures below 35° C., and in particular, temperatures of less than 20° or 25° C., are suitable. Sulphuric acid of about 75% strength, and a temperature of about 15° C. is preferred.

The following data illustrate the acid treatment of a diolefine-freed 4-carbon atom fraction which had been previously treated with less concentrated sulphuric acid whereby most of the isobutylene was converted to tertiary-butyl sulphate: 11.36 kilograms of a mixture of hydrocarbons in the liquid state containing 1.5% of isobutylene, 43.9% of butenes 1 and 2 and about 54.5% of butane was vigorously agitated with 15.9 kilograms of 76.5% sulphuric acid. The reaction time was 5 hours and the average temperature of the reaction was about 15° C. At the end of this time the unreacted hydrocarbons, consisting chiefly of butane, were removed, their amount being 7.72 kilograms. The secondary-alkyl sulphate liquor which was obtained was hydrolyzed and 3.86 kilograms of secondary-butyl alcohol were obtained. This represents an overall yield of 57.9% based on the total amount of butenes 1 and 2 at the beginning of the treatment. The alcohol formed from the quantity absorbed less the amount recovered was 86.6% of the theoretical. In this step 477 grams of oils were formed as a by-product.

The description of the process subsequent to the preparing of the two hydrocarbon fractions and the removal of cyclopentadiene from the 5-carbon atom fraction, has been confined to a 4-carbon atom fraction. The treatment of the 5-carbon atom fraction is carried out in like manner, first with sulphur dioxide and sulphur chloride to remove isoprene and diolefines other than cyclopentadiene from the fraction, and then with successive batches of sulphuric acid to form tertiary and secondary-alkyl sulphate liquors from which amyl alcohols may be produced. In the treatment for the removal of diolefines from the 5-carbon atom fraction the reaction between the hydrocarbon and sulphur dioxide can be carried out with a lower temperature in the autoclave than was used for the 4-carbon atom fraction, for example about 80° C. may be used instead of 100° C. In the sulphating treatments to form secondary sulphates the reaction temperature for the sulphation of the 5-carbon atom fraction should be about 10° to 20° C. lower than the temperature used for the 4-carbon atom fraction with acid of corresponding concentration. In all the sulphating reactions we prefer to operate at the vapor pressure of the hydrocarbon fraction being treated.

II. The process as described in the first example was modified with respect to the treatment of the 4-carbon atom fraction as follows: the diolefine-containing 4-carbon atom fraction obtained by the initial fractionation was first treated with sulphuric acid to form tertiary-alkyl sulphates from the isobutylene in the manner described. The hydrocarbons remaining after this treatment were then treated with sulphur dioxide to remove butadiene in the manner described in Example I. The diolefine-freed hydrocarbons, consisting mainly of butane and butenes 1 and 2, were then treated with acid to form secondary-alkyl sulphates as before. In this modification of the process there was no change in the treatment of the 5-carbon atom fraction.

It is possible to make this variation in treating the 4-carbon atom fraction because butadiene falls between isobutylene and the other butenes in the order of their reactivity with sulphuric acid. This mode of procedure is not preferred because a less clean-cut separation of the hydrocarbons is secured.

The process may be modified in other respects. For example, it may be advantageous to remove only a portion, for instance, three-fourths of the olefines in one treatment with sulphuric acid. This leaves a residue which is rich in paraffin hydrocarbons and which may then be treated in a separate step to reduce the olefine content to negligible proportions. This residue having most of the olefines removed may be fractionated to remove most of the paraffins, and the concentrated olefine portion may then be admixed with fresh hydrocarbons in the sulphating process. This procedure is particularly applicable to the second sulphation step wherein secondary-alkyl sulphates are formed, but it may be applied, in part, to the formation of tertiary-alkyl sulphates.

It will be seen that each mode of procedure set forth herein provides a novel process for the formation of alkyl sulphates. In each case diolefine hydrocarbons are removed and recovered before the hydrocarbon mixture is treated with sulphuric acid of a strength sufficient to affect the diolefines. This process for sulphating diolefine-freed material possesses distinct advantages over prior methods. It is more economical due to the fact that all the constituents of a hydrocarbon mixture are recovered in usable and valuable form, and because it results in more satisfactory yields of alcohols from the alkyl sulphates.

The foregoing conditions and proportions are obviously subject to modification and such variations are included within the scope of the invention.

We claim:

1. A process for preparing alkyl sulphate liquors from cracked hydrocarbon mixtures which includes the steps of separating from said mixture at least one fraction which is substantially free from hydrocarbons having less than four carbon atoms, treating said fraction to remove diolefines without lessening the olefine content of said fraction, said diolefines being removed in a form from which they are easily recoverable, treating the diolefine-freed material with about 45% to 65% sulphuric acid to form a tertiary-alkyl sulphate liquor and treating the hydrocarbon residue from said treatment with about 70% to 95% sulphuric acid to form a secondary-alkyl sulphate liquor.

2. A process for preparing alkyl sulphate liquors from cracked hydrocarbon mixtures which includes the steps of separating from said mixture at least one fraction which is substantially free from hydrocarbons having less than four carbon atoms, treating said fraction to remove diolefines without lessening the olefine content of said fraction, said diolefines being removed in a form from which they are easily recoverable, treating the diolefine-freed material with about 45% to 65% sulphuric acid at a temperature below about 35° C. to form a tertiary-alkyl sulphate liquor and treating the hydrocarbon residue from said treatment with about 70% to 95% sulphuric acid at a temperature below about 35° C. to form a secondary-alkyl sulphate liquor.

3. A process for preparing alkyl sulphate liquors from cracked hydrocarbon mixtures which includes the steps of separating from said mixture at least one fraction which is substantially free from hydrocarbons having less than four carbon atoms, treating said fraction to remove diolefines without lessening the olefine content of said fraction, said diolefines being removed in a form from which they are easily recoverable, treating the diolefine-freed material with approximately 60% sulphuric acid to form a tertiary-alkyl sulphate liquor and treating the hydrocarbon residue from said treatment with approximately 75% sulphuric acid to form a secondary-alkyl sulphate liquor.

4. A process for preparing alkyl sulphate liquors from cracked hydrocarbon mixtures which includes the steps of separating from said mixtures at least one fraction which is substantially free from hydrocarbons having less than four carbon atoms, treating said fraction to remove diolefines without lessening the olefine content of said fraction, said diolefines being removed in a form from which they are easily recoverable, treating the diolefine-freed material with approximately 55% to 65% sulphuric acid at a temperature of about 10° to 35° C. to form a tertiary-alkyl sulphate liquor and treating the hydrocarbon residue from said treatment with approximately 75% sulphuric acid at a temperature less than about 20° C. to form a secondary-alkyl sulphate liquor.

5. A process for preparing alkyl sulphate liquors from cracked hydrocarbon mixtures which includes the steps of separating from said mixtures at least one fraction which is substantially free from substances more volatile than hydrocarbons having less than four carbon atoms and from substances less volatile than hydrocarbons having five carbon atoms, treating said fraction to remove diolefines without lessening the olefine content of said fraction, said diolefines being removed in a form from which they are easily recoverable, treating the diolefine-freed material with about 45% to 65% sulphuric acid to form a tertiary-alkyl sulphate liquor and treating the hydrocarbon residue from said treatment with about 70% to 95% sulphuric acid to form a secondary-alkyl sulphate liquor.

6. A process for preparing alkyl sulphate liquors from cracked hydrocarbon mixtures which includes the steps of separating from said mixtures at least one fraction which is substantially free from substances more volatile than hydrocarbons having less than four carbon atoms and from substances less volatile than hydrocarbons having five carbon atoms, treating said fraction to remove diolefines without lessening the olefine content of said fraction, said diolefines being removed in a form from which they are easily recoverable, treating the diolefine-freed material with about 45% to 65% sulphuric acid at a temperature below about 35° C. to form a tertiary-alkyl sulphate liquor and treating the hydrocarbon residue from said treatment with about 70% to 95% sulphuric acid at a temperature below about 25° C. to form a secondary-alkyl sulphate liquor.

7. A process for preparing alkyl sulphate liquors from cracked hydrocarbon mixtures which includes the steps of separating from said mixtures at least one fraction which is substantially free from substances more volatile than hydrocarbons having less than four carbon atoms and from substances less volatile than hydrocarbons having five carbon atoms, treating said fraction to remove diolefines without lessening the olefine content of said fraction, said diolefines being removed in a form from which they are easily recoverable, treating the diolefine-freed material with approximately 55% to 65% sulphuric acid at a temperature of about 10° to 35° C. to form a tertiary-alkyl sulphate liquor and treating the hydrocarbon residue from said treatment with approximately 75% sulphuric acid at a temperature below about 20° C. to form a secondary-alkyl sulphate liquor.

8. A process for preparing alkyl sulphate liquors from cracked hydrocarbon mixtures which includes the steps of separating from said mixture a fraction consisting substantially of four carbon atom hydrocarbons, treating said fraction with about 45% to 65% sulphuric acid to form a tertiary-alkyl sulphate liquor, treating the hydrocarbon residue from said treatment to remove diolefines without lessening the olefine content of said fraction, said diolefines being removed in a form from which they are easily recoverable and treating the diolefine-freed material with about 70% to 95% sulphuric acid to form a secondary-alkyl sulphate liquor.

9. A process for preparing alkyl sulphate liquors from cracked hydrocarbon mixtures containing cyclopentadiene which includes the steps of separating from said mixture at least one fraction which is substantially free from hydrocarbons having less than four carbon atoms, treating said fraction to remove diolefines without lessening the olefine content of said fraction by dimerizing cyclopentadiene and removing dicyclopentadiene and by treating said fraction with SO₂ in the presence of a halogen-containing body to form a crystalline, soluble SO₂ addition product of the diolefines and removing said addition product, treating the diolefine-freed material with about 45% to 65% sulphuric acid to form a tertiary-alkyl sulphate liquor and treating the hydrocarbon residue from said treatment with about 70% to 95% sulphuric acid to form a secondary-alkyl sulphate liquor.

10. A process for preparing alkyl sulphate liquors from cracked hydrocarbon mixtures containing cyclopentadiene which includes the steps of separating from said mixture at least one fraction which is substantially free from hydrocarbons having less than four carbon atoms, treating said fraction to remove diolefines without lessening the olefine content of said fraction by dimerizing cyclopentadiene and removing dicyclopentadiene and by treating said fraction with SO₂ in the presence of a halogen-containing body to form a crystalline, soluble SO₂ addition product of the diolefines and removing said addition product, treating the diolefine-freed material with about 45% to 65% sulphuric acid at a temperature below about 35° C. to form a tertiary-alkyl sulphate liquor and treating the hydrocarbon residue from said treatment with about 70% to 95% sulphuric acid at a temperature below about 35° C. to form a secondary-alkyl sulphate liquor.

11. A process for preparing alkyl sulphate liquors from cracked hydrocarbon mixtures which includes the steps of separating from said mixture an olefine fraction comprising essentially olefines of four carbon atoms, treating said fraction to remove diolefines without lessening the olefine content of said fraction, said diolefines being removed in a form from which they are easily recoverable, treating the diolefine freed material with about 65% sulphuric acid to form a tertiary alkyl sulphate liquor and treating the hydrocarbon residue from said treatment with about 75% sulphuric acid to form a secondary alkyl sulphate liquor.

12. Process of sulphating olefines occurring in a mixture of hydrocarbons derived from the cracking of mineral oil and containing predominantly olefines of four carbon atoms including tertiary olefines and diolefines, which comprises selectively removing the unpolymerized diolefines from said mixture, reacting the diolefine freed mixture with aqueous sulphuric acid not exceeding about 65% strength at about 25° C. to sulphate the tertiary olefines and sulphating the remaining olefines with sulphuric acid of higher than 70% strength at a temperature below 35° C.

13. Process of treating olefines in a mixture of hydrocarbons containing mono and diolefines, which comprises separating a fraction, the olefine content of which consists predominantly of butadiene and butene, selectively removing unpolymerized butadiene from said fraction, thereby forming a remanent fraction containing free butene and thereafter sulphating the butene in said remanent fraction.

14. Process of treating olefines in a mixture of hydrocarbons consisting predominantly of olefines, which comprises separating a fraction consisting predominantly of butadiene and butene, selectively removing unpolymerized butadine from said fraction, thereby forming a remanent fraction containing free butene and thereafter sulphating the butene contained in said remanent fraction.

GRANVILLE A. PERKINS.
JOHN A. DAVIES.

CERTIFICATE OF CORRECTION.

Patent No. 2,271,092. January 27, 1942.

GRANVILLE A. PERKINS, ET AL.

It is hereby certified that error appears in the printed specification of the above numbered patent requiring correction as follows: Page 4, second column, line 70, claim 14, for "butadine" read --butadiene--; and that the said Letters Patent should be read with this correction therein that the same may conform to the record of the case in the Patent Office.

Signed and sealed this 24th day of March, A. D. 1942.

(Seal)

Henry Van Arsdale,
Acting Commissioner of Patents.